United States Patent [19]

Downey

[11] Patent Number: 5,255,695

[45] Date of Patent: Oct. 26, 1993

[54] VEHICLE WASHING APPARATUS

[76] Inventor: Emil Downey, 34 Connecticut Blvd., East Hartford, Conn. 06108

[21] Appl. No.: 807,760

[22] Filed: Dec. 17, 1991

Related U.S. Application Data

[63] Continuation-in-part of Ser. No. 663,663, Mar. 1, 1991, abandoned.

[51] Int. Cl.⁵ .............................................. B08B 3/02
[52] U.S. Cl. ................................... 134/123; 134/181; 134/199
[58] Field of Search ............... 134/45, 123, 139, 180, 134/181; 239/263.3; 464/79, 80

[56] References Cited

U.S. PATENT DOCUMENTS

| | | |
|---|---|---|
| 1,931,444 | 10/1933 | Mackin . |
| 2,057,388 | 10/1936 | Mackin . |
| 3,079,935 | 3/1963 | Padek . |
| 3,190,297 | 6/1965 | Austin et al. ................ 134/123 |
| 3,196,888 | 7/1965 | Rousseau . |
| 3,259,138 | 7/1966 | Heinicke ..................... 134/45 |
| 3,261,369 | 7/1966 | Thiele ......................... 134/123 |
| 3,288,109 | 11/1966 | Smith, Jr. et al. ........... 134/123 X |
| 3,370,596 | 2/1968 | Daum et al. . |
| 3,410,284 | 11/1968 | Burger . |
| 3,459,203 | 8/1969 | Pritchard .................... 134/123 |
| 3,533,422 | 10/1972 | Alimanestiano . |
| 3,559,659 | 2/1971 | Gougoulas . |
| 3,578,001 | 5/1971 | Attaway . |
| 3,701,356 | 10/1972 | Hanna et al. ............... 134/123 X |
| 3,759,275 | 9/1973 | Walters . |
| 3,795,254 | 3/1974 | Blooser ....................... 134/172 X |
| 4,135,533 | 1/1979 | Gall et al. . |
| 4,421,800 | 12/1983 | Schoenberg et al. . |
| 4,452,263 | 6/1984 | McClure . |
| 4,562,848 | 1/1986 | Messing et al. . |
| 4,679,578 | 7/1987 | Miller . |
| 4,715,391 | 12/1987 | Scheller . |
| 4,718,439 | 1/1988 | Gorra et al. . |
| 4,719,932 | 1/1988 | Burton . |
| 4,739,779 | 4/1990 | Jones et al. . |
| 4,852,593 | 8/1989 | Daugherty .................. 134/123 X |
| 4,889,147 | 12/1987 | Chandler .................... 134/123 |
| 4,893,229 | 1/1990 | Detrick ....................... 134/123 |
| 4,920,997 | 5/1990 | Vetter et al. . |
| 4,972,802 | 11/1990 | Belanger et al. ............ 134/181 |

FOREIGN PATENT DOCUMENTS

| | | | |
|---|---|---|---|
| 0041087 | 12/1981 | European Pat. Off. ............ | 134/123 |
| 462573 | 7/1928 | Fed. Rep. of Germany ...... | 134/123 |
| 2164498 | 7/1973 | Fed. Rep. of Germany . | |
| 2642959 | 3/1978 | Fed. Rep. of Germany ...... | 134/123 |
| 2745551 | 4/1978 | Fed. Rep. of Germany . | |
| 1051333 | 1/1954 | France ............................... | 134/123 |
| 509564 | 7/1930 | United Kingdom ............... | 134/123 |
| 378016 | 7/1932 | United Kingdom . | |
| 1131481 | 10/1968 | United Kingdom ............... | 134/123 |

Primary Examiner—Frankie L. Stinson
Attorney, Agent, or Firm—McCormick, Paulding & Huber

[57] ABSTRACT

A vehicle washing apparatus is comprised of U-shaped arches through which a vehicle passes during a washing operation. The arches contain a plurality of pivotally mounted conduits and spray nozzles through which various washing fluids are pumped. During a washing operation the conduits and nozzles are pivotally rotated about the conduit axes in an oscillatory motion that sweeps spray from the nozzles in an arc over a vehicle to be washed. Different washing fluids are applied to the vehicle in a sequence of operations that wash and rinse all sides of the vehicle.

11 Claims, 8 Drawing Sheets

VEHICLE WASHING APPARATUS

This is a continuation-in-part of co-pending application Ser. No. 07/663,663 filed on Mar. 1, 1991, now abandoned.

BACKGROUND OF THE INVENTION

The present invention resides in a vehicle washing apparatus having a series of archways through which a vehicle is moved while various washing fluids are sprayed under pressure onto the vehicle. The apparatus has utility with all types of vehicles including trucks, buses, railway cars and locomotives as well as passenger automobiles.

Vehicle washing apparatuses through which an entire vehicle such as a passenger automobile is pulled or driven are known in the prior art. Many of these apparatuses employ rotating brushes or brush-type rollers which make contact with the vehicle as part of the cleaning process. Other types of systems utilize spraying arrangements which apply a sequence of detergents and rinses to remove grease, dirt and other grime. Still other types of systems may use a combination of both spray arrangements and brushes.

Vehicle washing apparatuses that utilize spray arrangements are particularly popular because they do not scratch or mar the finish of the vehicle due to abrasive contact by brushes, rags or other frictional devices. The sprayed washing fluids typically include a presoak fluid and a soap that chemically loosen and remove dirt from the surface of the vehicle. A high pressure rinse is then applied to remove any remaining traces of dirt and the presoak and soap fluids. The rinse fluid may include softeners and surface tension relievers or surfactants to prevent spotting on the vehicle after washing. In addition, hot wax solutions in fluid form may be applied to the vehicle after cleaning. A final rinse consisting of distilled or RO (reverse osmosis) water is applied last.

The washing installations which employ spray arrangements typically include a passageway through which the vehicle to be washed passes as the various washing fluids are applied. The spray arrangements generally include a series of archways which are spaced along the passageway, fluid conduits including spaced nozzles supported by the archways and associated plumbing for delivering the washing fluids to the conduits. Prior art patents which disclose such systems include U.S. Pat. Nos. 3,370,596, 3,578,001, 4,135,533 and 4,715,391. Controls for sequencing the various washing operations may include a trip pad which is driven over by the vehicle as shown in U.S. Pat. No. 3,578,001 or an optical sensor such as an electric eye disclosed in U.S. Pat. No. 4,715,391.

While many of the spray arrangements in the prior art washing apparatuses have spray nozzles which remain stationary, a few arrangements employ nozzles which are moved at some point during the washing operation. For example, in U.S. Pat. Nos. 1,931,444 and 2,057,388, the spray nozzles are mounted on pipe sections which are rotated 90° from an inoperative, stowage position where the nozzles do not face the vehicle to an operative position closer to and facing the vehicle. Once in place, however, the nozzles remain stationary during the washing operation.

Still other washing apparatuses employ spraying arrangements in which the nozzles are moved in either an orbital path as in U.S. Pat. No. 4,679,578 or in a rotary path as shown in U.S. Pat. No. 4,920,997 for the purpose of distributing the washing fluids over the vehicle during the washing operation.

It is a general object of the present invention to provide a washing apparatus that utilizes movable spray nozzles to distribute washing fluids evenly over the vehicle being washed without the complexity of the prior art arrangements. By employing a unique mechanism for moving the nozzles, spray can be directed over the entire vehicle in a relatively brief period of time, and difficulties arising from mechanical wear and failure of movable parts are minimized to yield a more reliable system.

SUMMARY OF THE INVENTION

The present invention resides in a vehicle washing apparatus that employs a spray arrangement to apply washing fluids to the vehicle during a washing operation.

The washing apparatus includes a generally U-shaped archway through which a vehicle to be washed can pass. The archway has two vertically mounted support posts disposed at each lateral side of the passageway traversed by the vehicle during a washing operation, and a cross beam connected between the upper ends of the posts. Typically the archway is mounted within a building to protect against wind and weather, and the archway itself may comprise a structural element of the building.

Fluid conduit means is mounted on the U-shaped archway and includes a plurality of spray nozzles spaced along the conduit means for delivering washing fluids in a spray to the vehicle adjacent to or within the archway. The conduit means includes first and second conduit sections, each with spray nozzles. The first section extends generally vertically along the one support post of the archway, and the second section extends generally vertically along the other support post of the archway. Each section is pivotally mounted to the respective support post for pivotal movement about the vertically extending axis of the conduit section. Such a rotation causes the spray nozzles on the sections to be swept in an arc, and spray from the nozzles is thus distributed more evenly over the surface of the vehicle. Typically a series of archways with conduit means and spray nozzles are distributed in spaced relationship along the passageway for the vehicle so that the entire vehicle can be covered with spray over the course of a washing operation without moving the vehicle.

A source of washing fluid is provided and in the preferred embodiment various types of washing fluids including at least a presoak fluid, a soap, or combined presoak and soap solution, and a rinsing fluid are used.

Pump means connected between the source of washing fluid and the conduit means pumps the washing fluids under pressure through the conduits and the spray nozzles onto the vehicle. In the preferred embodiment, the pump means includes multiple pumps for delivering multiple washing fluids at different times in the course of a washing operation. The several pumps are controlled by a central computer which determines the time and sequence of fluid applications.

In order to move the spray nozzles and sweep the spray from the nozzles in an arc over a vehicle, pivotal drive means are connected with each of the conduit sections for pivotally rotating the conduit sections about the section axes. In this manner a more complete and even distribution of the washing fluids is achieved over all portions of the vehicle, and a brief but thorough washing operation can be performed.

DESCRIPTION OF THE PREFERRED EMBODIMENTS

Figure 1:
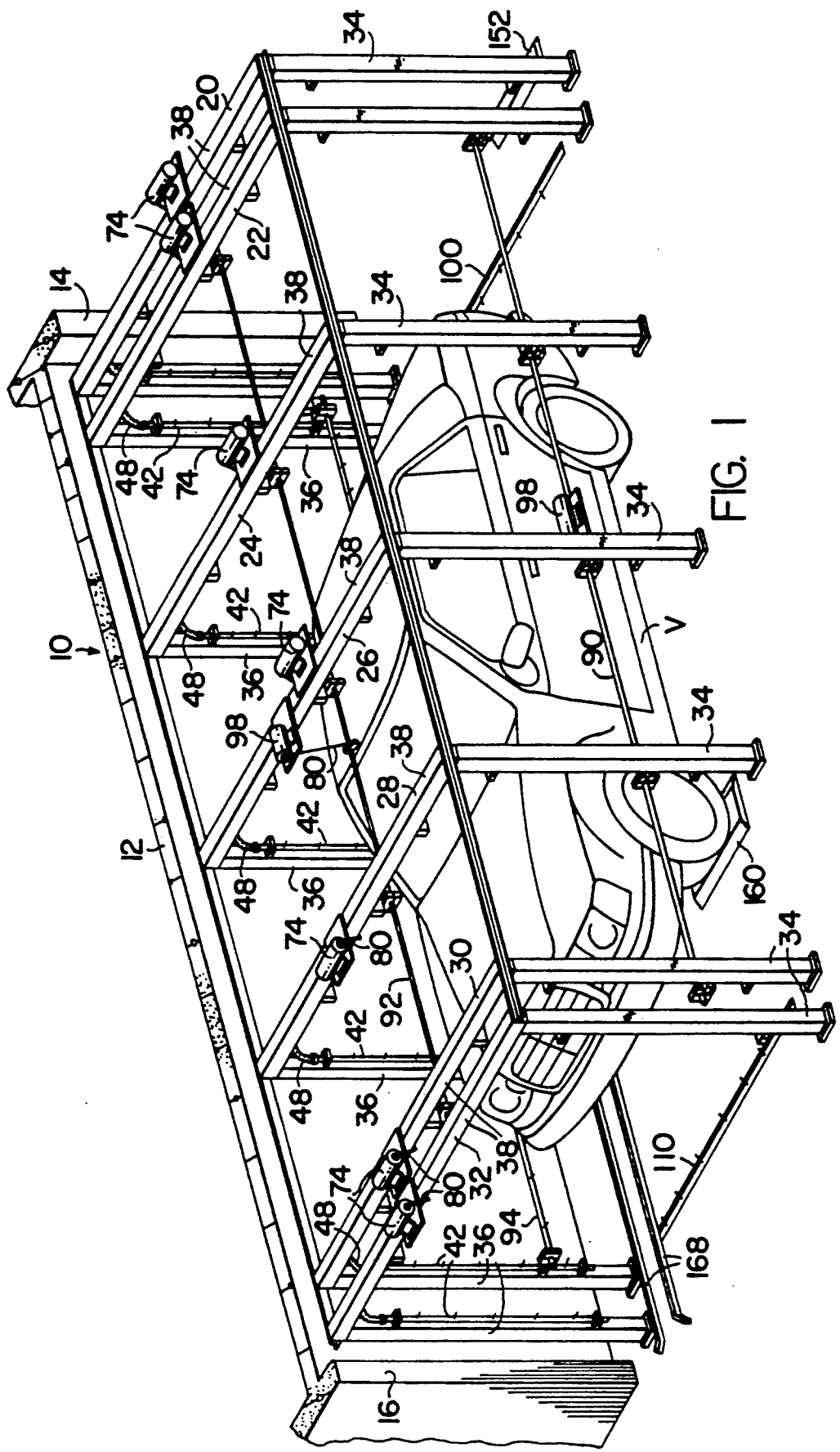
FIG. 1 is a perspective view illustrating one embodiment of the novel vehicle washing apparatus in accordance with the present invention.

FIG. 1 illustrates one embodiment of a vehicle washing apparatus, generally designated 10, constructed in accordance with the present invention. The washing apparatus is the type through which the vehicles to be washed are driven or otherwise propelled to accomplish a washing operation. The apparatus 10 is enclosed within a building, one wall 12 of which is shown, and has an entrance 14 at one end of the building and an exit 16 at the opposite end.

The washing apparatus includes a plurality of archways 20,22,24,26,28,30,32 disposed in spaced and longitudinally aligned relationship to define a passageway followed by vehicles V to be washed. The archways 22,24,26,28,30 are spaced approximately 6 feet from one another in a typical installation and the archway 20 is spaced approximately 18 inches from the archway 22. Similarly the archway 32 is spaced approximately 18 inches from the archway 30. In operation the vehicle V enters the apparatus 10 through the archways 20,22 at the building entrance 14 and stops generally at a midpoint of the passageway as shown in FIG. 1. After the washing operation is over, the vehicle proceeds through the archways 30,32 and out the exit 16 of the building.

As shown, each of the archways 20–32 of the apparatus 10 has essentially the same construction. For purposes of convenience, only the construction of the archway 22 is discussed as an example in FIG. 2. The archway includes two lateral, vertically mounted support posts 34,36 and a cross beam 38 interconnecting the support posts at the upper ends. The lower ends of the support posts are secured to the floor 40 of the car wash by clamps or brackets, or the posts may be actually buried in the floor and subsoil below. Preferably the floor is concrete or some other substance from which water, soaps and other washing fluids can be readily drained to a sump for reprocessing or disposal. The posts 34,36 and cross beam 38 in one free-standing embodiment of the invention are constructed of 4"×4" square aluminum tubing with a ¼" wall thickness so that other structures may be mounted on the posts or beam.

Figure 2:
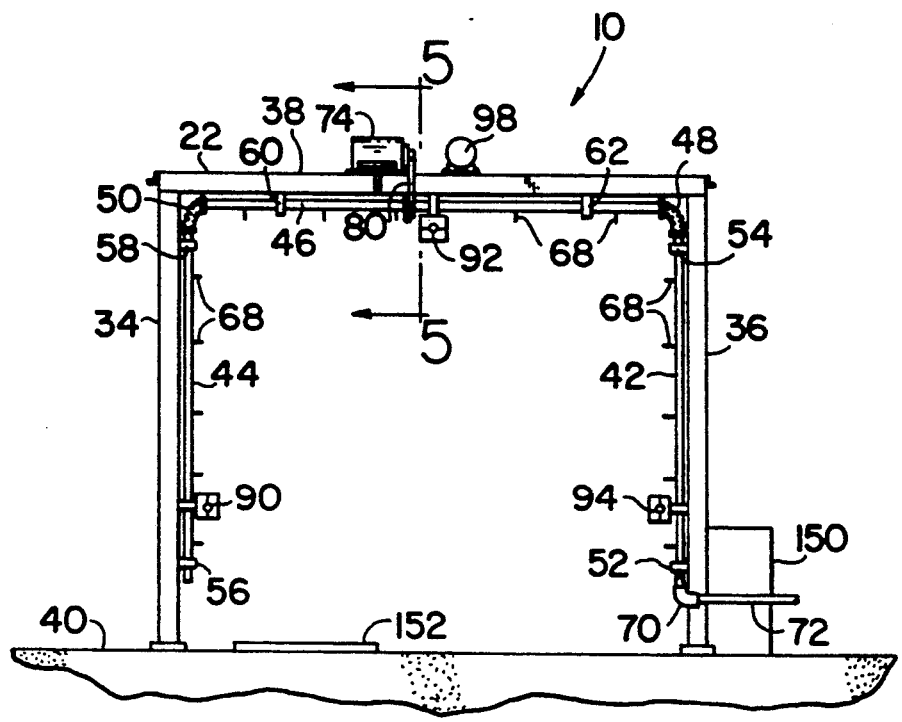
FIG. 2 is an end view of the vehicle washing apparatus in FIG. 1 near the entry end.

As shown in FIG. 2 a fluid conduit for dispensing washing fluids is mounted on the inwardly facing sides of the U-shaped archway. The conduit includes a first vertical section 42 mounted to the vertical support post 36, a second vertical section 44 mounted to the vertical support post 34 and a horizontal section 46 mounted to the cross beam 38. In one embodiment, the sections 42,44,46 are made from ¾" diameter aluminum tubing and are mechanically and fluidically interconnected by flexible conduit sections 48 and 50. The flexible sections are made from a pleated or bellows-like, high pressure rubber hose.

The conduit section 42 is mounted to the vertical support post 36 by means of pillow blocks or bearings 52,54 to allow the section to be pivotally rotated about the vertically extending axis of the section. Similarly, the section 44 is pivotally mounted to the vertical support post 34 by means of bearings 56,58. Also, the horizontal section 46 is pivotally mounted to the cross beam 38 by means of bearings 60,62 to allow the section to pivotally rotate about the horizontally extending axis of the section. It will be understood that with the flexible conduit sections 48,50 interconnecting the conduit sections 42,44,46, pivotal rotation of one tube section about its axis will be transmitted to each of the other tube sections so that each of the sections will rotate simultaneously about its respective axis.

Each of the conduit sections 42,44,46 has a plurality of spray nozzles 68 spaced along the conduit sections for delivering a washing fluid in a spray to a vehicle in or adjacent to the archway 22. For example, the nozzles may be mounted at intervals of 14 inches from each other in a line extending along the inwardly facing side of the conduit section. When high pressure washing fluid is pumped through the section, the fluid emanates from the nozzles in a spray pattern. As the sections are pivotally rotated back and forth in an oscillatory manner about their own axis, the spray from the nozzles is swept back and forth in an arc. The limits between which the spray pattern is moved are selected to ensure that the spray from each pattern covers evenly a portion of the vehicle larger than the spray pattern itself. In this manner the number of archways required to cover a vehicle can be kept to a minimum and the repetitions of washing fluid application to a given area of the vehicle are increased. Typically the total included angle or arc through which a spray pattern is moved is less than 180° and may range from ±30° to ±60°.

The mechanism for plumbing high pressure fluid to the rotatable fluid conduit sections can take several forms, but in the preferred embodiment of the invention shown in FIG. 2, a rotatable coupling 70 is connected to the lower end of one lateral conduit section 42 and a stationary supply line 72 feeds washing fluid through the coupling to the pivotally mounted section. The fluid coupling 70 has two pipe sections that are interconnected by means of swiveling joints and seals to allow fluid to pass through the coupling while one pipe section is held stationary and the other pipe section is rotated. One such coupling is manufactured by Debulin Co., Northbrook, Ill.

Figure 5:
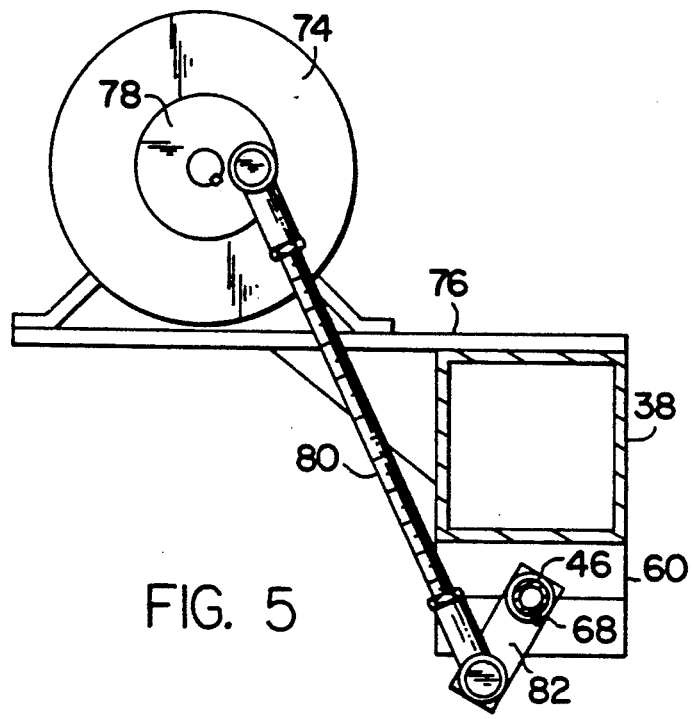
FIG. 5 is a fragmentary view illustrating the drive mechanism for oscillating the spray nozzles.

One mechanism for pivotally rotating the conduit sections 42,44,46 within each U-shaped archway is illustrated in FIG. 5. A drive motor 74, typically an electrical drive motor with a gear reduction unit, is mounted on a support platform 76 connected to the cross beam 38 of an archway. The output shaft of the motor includes a crank flange 78 which is connected by means of an adjustable length control rod 80 to a crank arm 82 secured to the horizontally extending conduit section 46. The connection between the crank arm 82 and the section 46 may be made by means of an adjustable clamping ring or flange. The control rod 80 is adjustable in length to reposition the crank arm 82 and change the effective length of the crank arm at the center position of the spray nozzles on the section 46. The change in the crank arm length brings about a similar change in the size of the arc through which the nozzles 68 are swept and the corresponding arc through which the spray pattern moves. Some adjustment of the crank arm 82 and the section 46 is needed when the control arm 80 is adjusted so that the center position of the spray nozzles 68 is not changed.

When the drive motor 74 is operated, the crank flange 78 is rotated through the gear reduction unit of the motor at a slow speed. The size of the crank flange 78 and crank arm 82 are selected so that with each revolution of the flange, the crank arm and correspondingly the conduit section 46 oscillate and sweep the nozzles and sprayed washing fluid back and forth within the intended limits of the spray pattern.

While the several archways 20-32 with pivotally mounted and oscillated conduit sections mounted in the U-shaped pattern suffice to apply washing fluids evenly over the entire surface of a vehicle, an advantageous improvement to the washing apparatus 10 includes a horizontally extending conduit section 90 pivotally mounted to the vertical support posts 34 at one side of the archways, a horizontally extending conduit section 92 pivotally mounted to the cross beams 38 of the archways and a horizontally extending conduit 94 pivotally mounted to the support posts 36. The pivotal mounting to each archway is accomplished by means of bearings as with the conduit sections 42,44,46. Each of the horizontally extending conduits 90,92,94, includes a plurality of spray nozzles spaced along the conduits and facing generally inwardly of the archways for dispensing washing fluids onto a vehicle to be washed. Drive motors 98 and associated drive linkages similar to those illustrated in FIG. 5 are connected respectively with each of the horizontally extending conduits to oscillate the spray nozzles and the conduits and sweep the spray in a arc over the vehicles to be washed. The limits of the arc through which the spray pattern is swept may range from ±30° to ±60°, but generally would be selected to ensure full coverage of the side of the vehicle toward which the nozzles are pointed.

Figure 6:
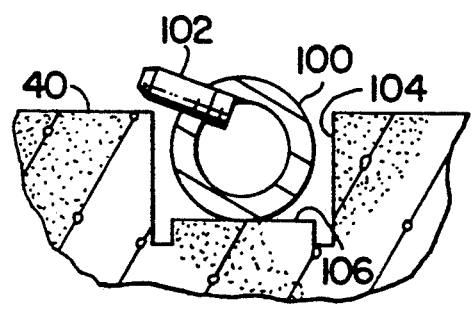
FIG. 6 is fragmentary view illustrating the ground level spray nozzles.
Figure 3:
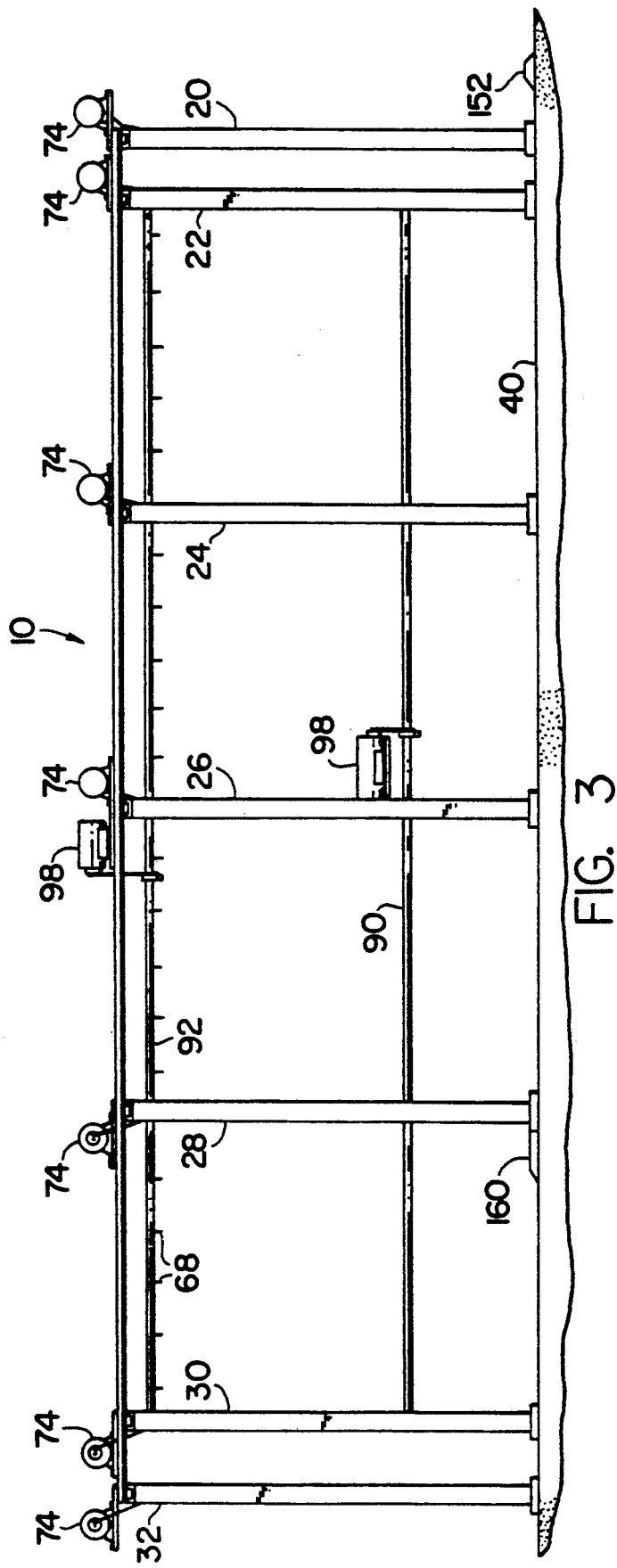
FIG. 3 is a side elevation view of the vehicle washing apparatus in FIG. 1.

As shown in FIG. 5 and in the fragmentary view of FIG. 6, a further conduit 100 with spray nozzles 102 spaced along the conduit is mounted in a recess 104 of the floor 40. The conduit 100 is a fixed conduit and may be welded to a mounting pad 106 secured to the bottom of the recess. The conduit has sufficient strength to be run over by the tires of a vehicle.

Figure 4:
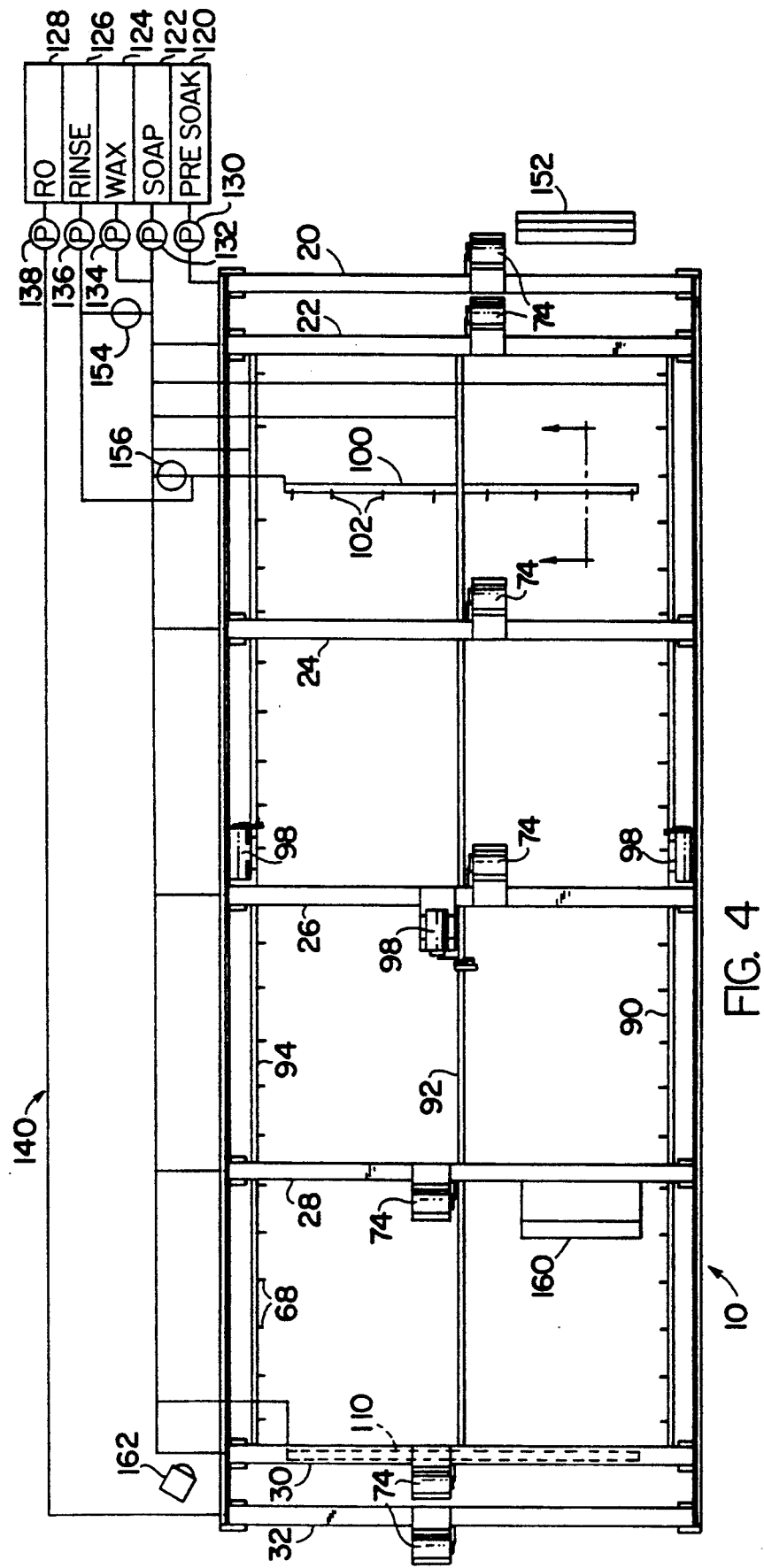
FIG. 4 is a top plan view of the vehicle washing apparatus in FIG. 1.

As shown in FIG. 4, the conduit 100 is mounted in the floor 40 at a position between the U-shaped archways 22 and 24 and extends transversely across the passageway followed by a vehicle through the washing apparatus. The length of the conduit 100 is approximately 8 feet and the spray nozzles 102 are disposed at an angle of less than 90° to the floor, for example 20°, to project washing fluid upwardly against the undercarriage of a vehicle as the vehicle moves into the archways in a washing operation. Such washing of the underside of the vehicle removes dirt, mud, lose gravel and corrosive salts that have been picked up by the vehicle in the course of its travels. The angled relationship of the nozzles 100 is selected to direct fluids against the rear of a vehicle after it has passed over the conduit 100. In this fashion the spray directed from the archways 20 and 22 onto the vehicle is augmented.

In a similar fashion, another ground level conduit 110 shown in FIG. 4 near the exit end of the washing apparatus is mounted in a floor recess with nozzles that are directed at an angle of less than 90° to the floor, for example 30°, toward the front of a vehicle within the washing apparatus.

As shown in FIG. 4, the washing apparatus 10 has a plurality of fluid sources or tanks 120,122,124,126,128 for storing the various washing fluids that are used by the apparatus. For example, the tank 120 typically contains a presoaking wash fluid that is applied to the vehicle for the purpose of loosening heavy grime and dirt as the vehicle passes through archway 20. Fluid pumps 130,132,134,136,138 are connected respectively between the tanks 120,122,124, 126,128 and the various conduit sections 42,44,46,90,92, 94,100,110 by means of valves, piping and other plumbing, all generally designated 140, for pumping the washing fluids under pressure through the conduits and spray nozzles. The pump 132 as shown delivers a soap fluid from the tank 122 to the conduit sections in each of the archways 22,24,26,28,30. Similarly the pump 134 delivers a hot wax solution from the tank 124 to the conduits in archways 22,24,26,28,30. If desired the hot wax application can be an option selected by the driver of the vehicle prior to the washing operation.

The pump 136 delivers a rinse fluid from the tank 126 to the conduits in archways 22,24,26,28,30 as well as the floor level conduits 100,110 for removing the soap and presoak solutions from the vehicle prior to any hot wax application and also for rinsing after the hot wax application. The last pump 138 delivers distilled or RO (reverse osmosis) water from the tank 12 to the conduits in the last archway 132 to provide a final rinsing operation that avoids spots on the vehicle after the fluids have dried.

Figure 8:
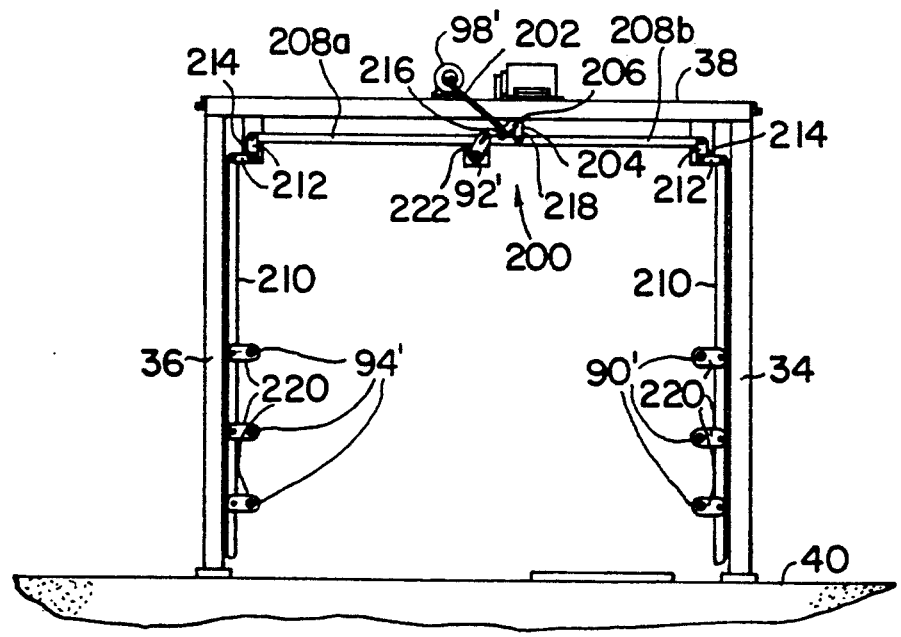
FIG. 8 is a sectional view taken along line 8—8 of FIG. 7.
Figure 7:
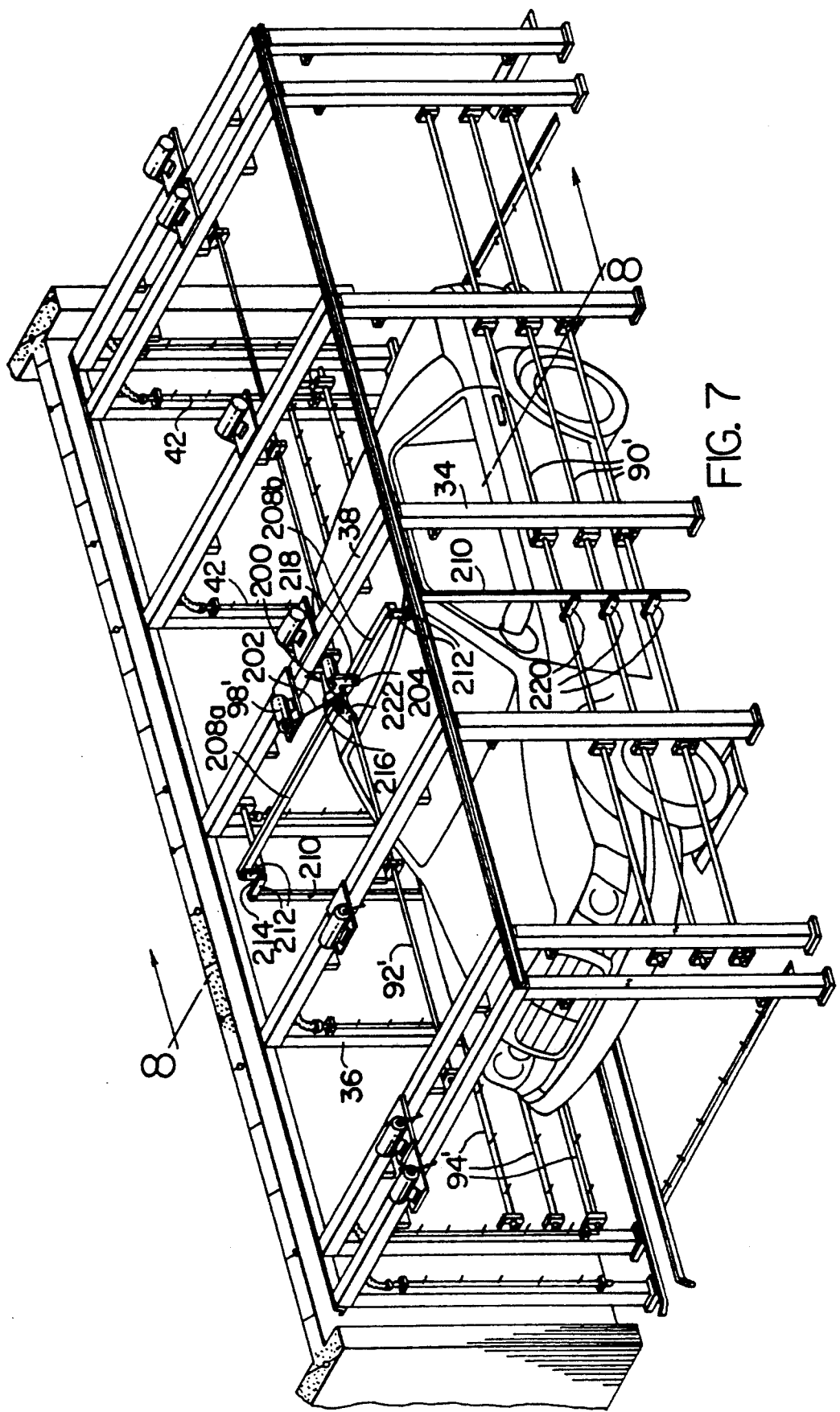
FIG. 7 is a perspective view illustrating another embodiment of the vehicle washing apparatus of the present invention.
Figure 9:
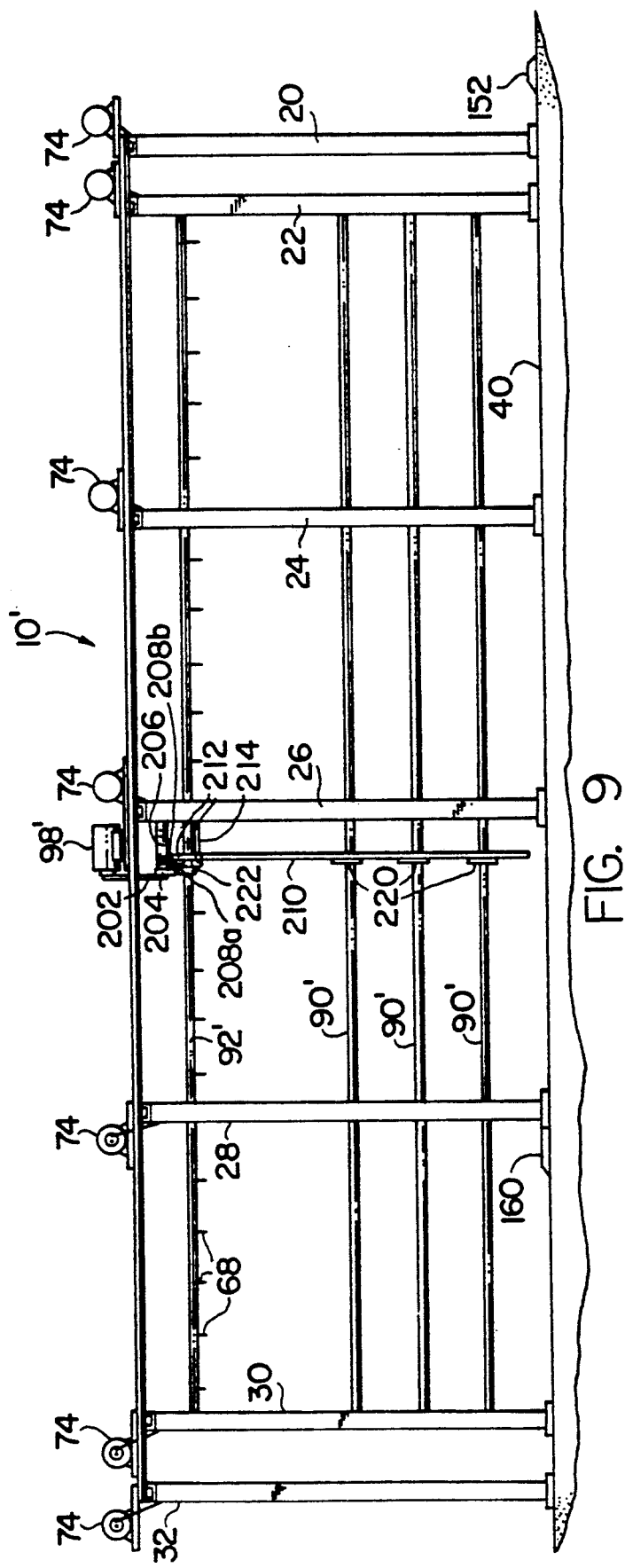
FIG. 9 is a side elevation view of the apparatus of FIG. 8.

Referring now to FIGS. 7-9, and in particular to a second embodiment of the invention, it should be seen that the apparatus herein shown includes a plurality of pivotal horizontally extending conduits 90',90' and 94',94' provided along laterally opposed sides of the structural frame defining the path followed by the vehicle through the apparatus. For this purposed, these conduits are pivotally mounted on the support posts 34,36 of the arches through the intermediary of bearing members for oscillation in a manner hereinafter to become apparent.

The conduits are driven so as to oscillate their associated spray nozzles by a common drive motor 98' drivingly connected to them through the intermediary of a drive linkage means 200. The means 200 includes a control arm 202, and a crank member 204 pivotally mounted to the cross beam 38. The crank member 204 is pivotally connected to the adjacent ends of horizontally disposed links 208a and 208b. Two vertically disposed second links 210,210 are interconnected to these links 208 and 208a by corner links 212,212, each corner link being mounted for pivotal movement on the cross beam 38 on a respective one of the pivot pins 214,214. The first and second portions of the crank member 204 are disposed relative to one another at an angle equalling approximately 45 degrees. As such, when the crank flange 78 of the motor 98' rotates, it causes a reciprocating motion to be imparted to the second vertically disposed links 210,210.

The horizontal conduits 90',90' and 94',94' have crank arms 220,220 fixed to it which project inwardly from an associated one of the vertically disposed links 210,210. Each arm 220 at its free end is pivotally connected with the associated one of the vertically disposed links 210,210 for vertical reciprocation thereof, all the horizontally disposed conduits 90',90' and 94',94' with their inwardly directed nozzles being caused to oscillate to effect improved cleaning of the vehicle side walls.

In a similar manner, as seen more particularly in FIG. 8, the upper horizontally disposed conduit 92' may be connected to the first link 208a through the intermediary of a pin and slot formed in the first link 208a and in the subcrank arm 222 associated with the conduit 92' thereby oscillating the conduit 92' in unison with the other horizontally disposed conduits. It is noted that flexible hoses are employed to connect each horizontal conduit with the fluid pump to thereby allow such oscillation to occur.

OPERATION

To begin a washing operation a vehicle is driven up to the entrance archway 20 of the washing apparatus 10. A coin operated switch or a switch controlled by a human operator activates a master controller 150 shown in FIG. 2 which is typically a control computer connected with the pumps, the drive motors and other control elements for governing the sequence and duration of each phase of the washing operation. With the apparatus activated, the vehicle to be washed is driven into the series of U-shaped arches 20-28.

Initially the front wheel of a vehicle passes over the trip plate 152 in FIG. 4 and causes the pump 130 to deliver washing fluid from the presoak tank 120 to the spray nozzles within archway 20. As the vehicle passes through the archway, the presoak washing fluid is sprayed at high pressure onto the front, sides, top and rear of the vehicle. At the same time, the drive motor 74 causes the spray nozzles to oscillate back and forth. Presoak fluid loosens heavy dirt and grime from the surface of the vehicle by chemical action and flushes some of the heavy dirt to the ground. The pump 130 is shut off after five seconds of operation.

After a short time delay and while the vehicle is still moving into the passageway through the archways, pump 132 delivers a soap or cleaning fluid from the tank 122 to each of the nozzles within the archways 22,24,26,28,30. The nozzles within the archway 22 are preferably angled toward the archway 24 so that the rear side of the vehicle receives the soap fluid more directly after the vehicle has passed through the archway 22. Similarly, the nozzles within the archway 30 are angled toward the archway 28 so that the front of the vehicle receives soap fluid more directly from the oscillating nozzles.

At the same time that the pump 132 is activated, the pump 136 is activated, the valves 154,156 in the plumbing 140 are closed and rinse fluids are delivered through the floor mounted conduit 100 to spray the undercarriage of the vehicle as it passes over the conduit. Typically the rinse solution is simply water; however, in some installations a separate pump and tank containing a special undercarriage cleaner and preservative can be used in place of the rinse water.

As the vehicle passes through the archways, it may be guided by means of floor mounted guide bars 168 or channels shown in FIG. 1 to ensure that the vehicle remains generally centered within the archways equidistant from the nozzles at each side of the washing apparatus. Eventually the vehicle reaches a trip plate 160 shown in FIG. 4 in the vicinity of the archway 28, and a stop light 162 changes from green to red to instruct the vehicle driver to stop. The application of the soap continues with the nozzles in archways 22,24,26,28,30 continuing to oscillate for a period of time to distribute the soap fluid evenly over the entire vehicle. The nozzles in archways 22 and 30 are aimed generally toward the vehicle rather than transversely of the passageway for efficient utilization of the fluids. The ground level conduit 110 at the front end of the vehicle is also supplied with a soap fluid, and directs the fluid against the front of the vehicle to remove bugs, grease and other particles which are generally difficult and stubbornly adherent.

The high pressure of the fluid is utilized in conjunction with the soap to drive dirt and grime off of the vehicle surfaces. In one embodiment, for example, the soap solution when applied through the oscillating nozzles is applied for approximately 10-20 seconds. Thereafter the control computer 150 shuts off the pump 132 and the rinsing phase of the washing operation begins.

Actuation of pump 136 and opening of valve 154 delivers a rinse fluid, such as pure water or water treated with a surfactant, through the nozzles of archways 22,24,26,28,30 as well as through the ground level conduits 100,110, the longitudinally extending conduits 90,92,94 and the nozzles disposed thereon. It will be noted that the nozzles in the vicinity of each end of the longitudinally extending conduits may be directed at an angle toward the front and rear of the vehicle respectively. The oscillation of the nozzles in each archway ensures that the rinse fluid is sprayed several times over the entire vehicle in adequate quantities to remove the soap fluids previously applied.

The oscillation of the longitudinally extending conduits 90,92,94 by the motors 98 also distributes the rinse solution evenly over the entire vehicle. A typical operating time for applying the rinse fluid to remove the soap is 10-20 seconds.

The next phase of the washing operation may routinely or optionally include energization of the pump 134 to deliver a hot wax fluid from tank 124 to the exterior surfaces of the vehicle through the nozzles of archways 22,24,26,28,30. Valve 156 may be opened if more wax is desired on the rear of the vehicle. After the wax is applied and allowed to sit briefly, the vehicle is again rinsed through the nozzles of archways 22,24,26,28,30 with fluids from the tank 126. A 10-20 second application is typical.

At this point in the cleaning process the vehicle has been washed and rinsed and for the most part the washing operation is complete. When the last rinsing operation is over, the pump 136 is shut off and the stop light 162 changes from red back to green. The operator of the vehicle then pulls the vehicle out of the washing apparatus through the archway 32. One final rinse of RO or distilled water is applied by the pump 138 from the tank 128 through the oscillating nozzles of archway 132. The RO water is intended to rinse the remnants of any dirt or washing fluids from the vehicle so that the vehicle will dry without spotting. The control computer 150 shuts off the pump 138 after a brief period of time, for example 10 seconds, and the vehicle washing apparatus is then prepared to receive the next vehicle.

The entire time for the washing operation described above is approximately two minutes which represents a significant improvement over car washes of the prior art.

Figure 10:
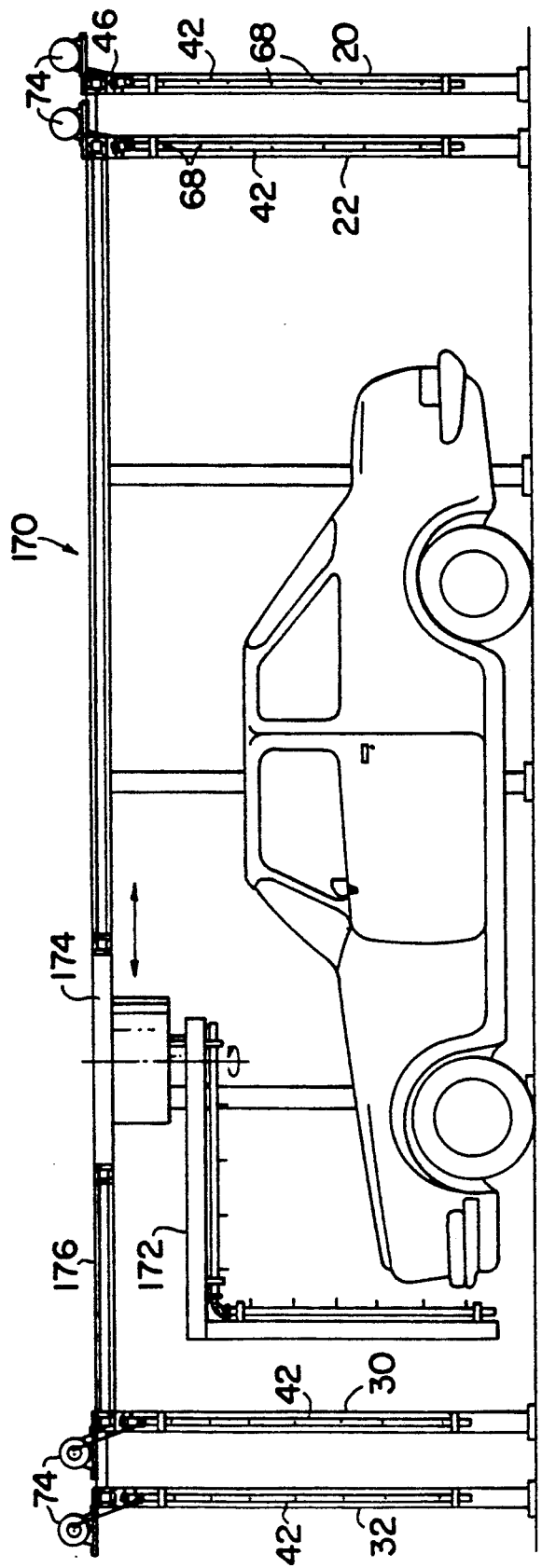
FIG. 10 is a side elevation view illustrating another embodiment of the vehicle washing apparatus.

FIG. 10 illustrates another embodiment of the automatic vehicle washing apparatus, generally designated 170, which employs a rotating wand 172 to apply the soap, wax and rinse fluids to the vehicle when positioned at the center of the apparatus. As in the first embodiment, U-shaped archways 20 and 22 with spray nozzles oscillated by drive motors 74 are located at the entrance of the apparatus. The nozzles 68 of the archway 20 apply a presoak fluid to the vehicle V as it moves into the washing apparatus 170 and the nozzles of the archway 22 apply a soap solution to the vehicle.

At the center of the apparatus 170, the washing wand 172 is rotatably mounted to an overhead gantry 174 which is movable back and forth between the archways 22 and 30 on tracks 176. When the vehicle has reached the center of the apparatus 170, a soap solution is delivered through the gantry 174 to the wand 172, and drive motors (not visible) within the structure cause the wand to traverse the outside of the car while the gantry moves back and forth to apply further soap solution to the car. The extent of movement of the gantry 174 between the archways 22 and 30 during both soaping and rinsing operations may be limited by electric eyes or photocells which in essence determine the overall length of vehicle.

After the soap solution has been applied, a rinse solution is pumped to the wand 172, and again the wand traverses the outside of the vehicle to remove the soap and dirt released from the surface of the car.

After the wand has returned to a "home" position at one side of the vehicle, the vehicle is driven out of the washing apparatus through the archways 30 and 32. The archway 30 is activated and applies additional rinse fluid to the front, top, sides and rear of the vehicle. Similarly, the rotating nozzles of the archway 32 apply a final rinse solution in the form of distilled or RO water to leave the vehicle spotless when it dries.

While the present invention has been described in several preferred embodiments, it will be understood that numerous modifications and substitutions can be had without departing from the spirit of the invention. For example, it is apparent that the number of archways utilized can be increased or decreased provided that the type of vehicle to be washed is adequately scanned by the spray pattern from the oscillated nozzles. The number of archways which are activated and the sequence of activation of the archways can be controlled by photocells which detect the position and length of the vehicle being washed. While the conduits extending laterally through the washing apparatus have been described as applying rinse fluids to the vehicle, it will be understood that such conduits may be omitted or may also be used to apply a presoak or soap fluids to the vehicle. All such variations in the construction and operation of the washing apparatus can be accomplished with suitable modifications in the piping and valves within the plumbing 140. The unique arrangement of oscillating conduits and spray nozzles can be accomplished by rotating any one of the interconnected conduit sections by a single drive motor or by disassociating the sections and providing separate drive motors for each conduit section or group of sections. The flexible hose connections between the various conduit sections within an archway may serve solely to provide fluid communication between the sections and other mechanical means may be provided for the mechanical connections.

Accordingly, the present invention has been described in several preferred embodiments by way of illustration rather than limitation.

I claim:

1. A vehicle washing apparatus comprising:
   a frame including a plurality of generally U-shaped archways through which a vehicle to be washed can pass, each of said archways including two lateral, vertically mounted support posts, each having upper and lower ends, and a cross beam connected between the upper ends of the posts;
   fluid conduit means mounted on the U-shaped archway and including a plurality of spray nozzles spaced along the conduit means for delivering a washing fluid in a spray onto a vehicle passing through the archway, the conduit means including first and second vertically disposed conduit sections with spray nozzles, the first section extending generally vertically along one of said support posts of the archway and the second section extending generally vertically along the other support post, each section being pivotally mounted to the respective support posts for pivotal rotation about the vertically extending axes of the conduit sections;
   a source of washing fluid;
   pump means connected between the source of washing fluid and the conduit means for pumping washing fluid under pressure through the conduit means and spray nozzles;
   pivotal drive means connected with each of the conduit sections for pivotally rotating the vertically disposed conduit sections about the section axes and sweeping spray from the nozzles in a horizontal arc over a vehicle adjacent the archway;
   said fluid conduit means includes a third conduit section extending generally horizontally between the upper ends of the support posts and pivotally mounted to the archway for pivotal rotation about the horizontal axis of the section, the third conduit section having a plurality of spray nozzles and being connected in fluid communication with the pump means for spraying washing fluid onto a vehicle adjacent the archway and also being connected with the pivotal drive means for pivotal rotation about the horizontal axis of the section and for sweeping spray from the nozzles in a vertical arc over the vehicle;
   said pivotal drive means includes flexible hoses mechanically and fluidically connecting the first, second and third conduit sections for simultaneous pivotal rotation and supply of washing fluid from the pump means; and
   a plurality of horizontally disposed conduits each being pivotally supported on said frame for rotation on horizontal axes, said plurality of horizontally disposed conduits having inwardly directed nozzles and being connected to said pump means for pumping washing fluid under pressure through each of said nozzles in a vertical arc, said horizontally disposed conduits being connected to the pivotal drive means for pivotally rotating the horizontally disposed conduits about the horizontal axes and sweeping spray from the nozzles in a vertical arc over a vehicle adjacent the archway.

2. A vehicle washing apparatus as defined in claim 1 wherein the pivotal drive means is connected to pivotally rotate the conduit sections and spray nozzles through arcs of less than 60° and more than 30°.

3. A vehicle washing apparatus as defined in claim 1 wherein the pivotal drive means includes a single drive motor, said flexible hoses coupling the first and second conduit sections to the ends of said third conduit section.

4. A vehicle washing apparatus as defined in claim 1 wherein the pivotal drive means is connected to the conduit sections for pivotally rotating the sections in an oscillatory manner.

5. A vehicle washing apparatus as defined in claim 1 wherein:
the U-shaped archway is mounted in an upright position on the floor and defines a vehicle passageway; and
a conduit section having a series of spaced spray nozzles is disposed on the floor and aimed in a direction transverse to the vehicle passageway with the nozzles projecting upwardly to spray the underside of a vehicle.

6. A vehicle washing apparatus as defined in claim 5 wherein the series of spray nozzles are aimed upwardly at an angle less than 90° from the floor.

7. A vehicle washing apparatus comprising:
a frame including a plurality of generally U-shaped archways through which a vehicle to be washed can pass, each of said archways including two lateral, vertically mounted support posts, each having upper and lower ends, and a cross beam connected between the upper ends of the posts;
a source of washing fluid;
fluid conduit means mounted on the U-shaped archway and including a plurality of spray nozzles spaced along the conduit means for delivering a washing fluid in a spray onto a vehicle passing through the archway, the conduit means including first and second vertically disposed conduit sections with spray nozzles, the first section extending generally vertically along the one support post of the archway and the second section extending generally vertically along the other support post, each section being pivotally mounted to the respective support posts for pivotal rotation about the vertically extending axes of the conduit sections;
said fluid conduit means further including a third conduit section extending generally horizontally between the upper ends of the support posts and pivotally mounted to the archway for pivotal rotation about the horizontal axis of the section, the third conduit section having a plurality of spray nozzles and being connected in fluid communication with the pump means for spraying washing fluid in a vertical arc onto a vehicle adjacent the archway;
pump means connected between the source of washing fluid and the conduit means for pumping washing fluid under pressure through the conduit means and spray nozzles;
pivotal drive means connected with each of the conduit sections for pivotally rotating the vertically disposed conduit sections about the section axes and sweeping spray from each of the nozzles in a horizontal arc over a vehicle adjacent the archway;
a plurality of horizontally disposed conduits each being pivotally supported in said frame for rotation on horizontal axes, said plurality of horizontally disposed conduits having inwardly directed nozzles and being connected to said pump means for pumping washing fluid under pressure through each of said nozzles in a vertical arc;
said plurality of horizontally disposed conduits being arranged laterally inwardly of the vertical support posts of said plurality of archways such that at least two horizontal conduits extend along each side of the path followed by a vehicle passing through the archways; and
linkage means drivingly connecting each of said horizontally disposed conduits with said drive means for causing said horizontally disposed conduits to be oscillated by the same drive means as that provided for said vertically disposed conduit sections.

8. An apparatus as defined in claim 7 wherein said linkage means includes a first link member driven by said drive means, a corner link connected to said first link member and a vertically disposed second link member connected for reciprocating movement to said first link member through the intermediary of said corner link member, each corner link member being pivotally mounted to said frame.

9. A apparatus as defined in claim 8 wherein said plurality of horizontally disposed conduits includes a top conduit supported above the path along which a vehicle is to pass through said plurality of archways, and said top conduit being fluidically connected by said pump means to a source of washing fluid and being supported by said frame in a pivotal relationship therewith.

10. A apparatus as defined in claim 9 wherein said top conduit is connected to and is oscillated with said linkage means.

11. A apparatus as defined in claim 10 wherein each of said horizontally disposed conduits includes a subcrank fixed thereto and drivingly coupled to said linkage means.

* * * * *